March 1, 1949.     W. O. TEASDALE     2,463,067
SLIDE RULE INDICATOR
Filed July 18, 1947

INVENTOR.
WILLIAM O. TEASDALE
BY Everett A. Curtis
ATTORNEY.

Patented Mar. 1, 1949

2,463,067

UNITED STATES PATENT OFFICE 2,463,067

SLIDE RULE INDICATOR

William O. Teasdale, San Diego, Calif.

Application July 18, 1947, Serial No. 761,797

2 Claims. (Cl. 235—70)

My invention relates to improvements in slide rule indicators, including each of the four kinds of well known indicators which are distinguishable as follows, namely:

Two kinds of "framed" glass indicators, one for the "Duplex" rule, and one for the "Mannheim" rule; and Two kinds of "frameless" glass indicators, one for the "Duplex" rule, and one for the "Mannheim" rule; one or another of these four indicators constituting a part of each slide rule.

As is well known, the "Duplex" and the "Mannheim" slide rules, ever since prior to 1911, have been the two slide rules of the domestic art favored above all other types combined in the ratio of about ten to one.

In the normal operation of the "Duplex" rule and the "Mannheim" rule, the indicator is continually oscillated along the length of the rule, and during the oscillations the face of the indicator glass bearing the hairline and the face of the rule bearing the scales contact and rub against each other. This is a serious defect, since the rubbing contact of these faces scratches and mars both of them, blurs the hairline on the glass and the scale marks on the rule, and decreases the visibility and accuracy in reading the scales, particularly in view of the fine dust particles that settle on the face of the rule, which rapidly increase such damaging effects.

Another serious result of this defect, is that, when the hairline is set to a given mark on the scales, it may be accidentally moved off of that mark by operating the slide, which result tends to destroy the usefulness of the indicator. This defect has existed throughout the period noted above, without any remedy ever having been made available to the trade by any of the leading instrument dealers in the United States.

The main purpose of this invention is to eliminate said defect by providing the slight, but definite clearance necessary to prevent the contact of the glass and rule. This clearance will insure complete and permanent protection against the aforesaid damaging effects, resulting in a clear vision, increased accuracy and convenience in general use throughout the life of the rule, and prolongation of the useful life of the rule about one hundred percent (100%) over the prior indicators above referred to.

The invention may be easily and economically manufactured and installed on new "Duplex" and "Mannheim" slide rules, without dispensing with any of the parts, and without any changes whatever in the design or the details of the existing structures. And this installation applies equally well to the many thousands of these slide rules now in use. The improvement is scarcely visible when installed, so it does not affect the appearance or balance of the rule. The simplicity and utility of this invention will be immediately apparent to those skilled in the art, and it is believed that the advantages of the invention would be recognized by producers and dealers to the extent that they would favor its adoption and the putting of it on the market so that it would become useful to the trade.

Other objects consisting of various other novel features of construction, combination or arrangement of parts will appear in the drawing and as hereinafter set forth and described.

The present application includes most or substantially all of the disclosure presented in my earlier copending application, Serial No. 606,756, filed July 24, 1945, entitled "Slide rule indicators," now abandoned, and is a continuation in part thereof, and I reserve such earlier date for all common subject matter set forth and claimed herein.

Attention is hereby directed to the drawing, illustrating preferred forms of my invention, in which similar numerals of designation refer to similar parts throughout the several views, and in which.

Figures 1, 2, 3:
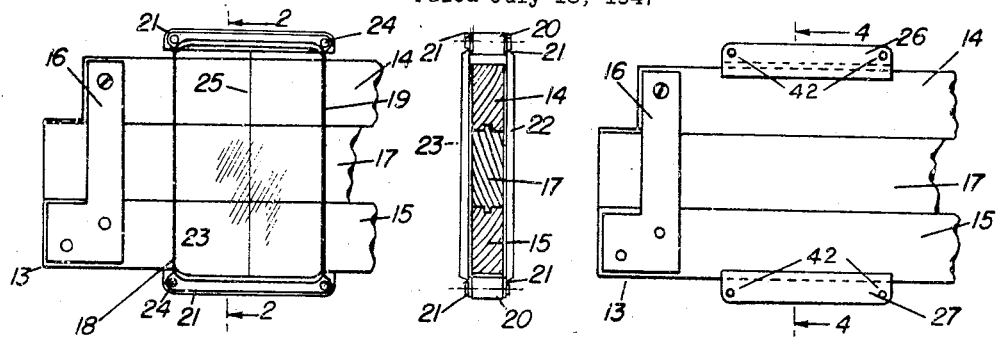
Figure 1 is a plan view of one end portion of a "Duplex" slide rule, showing the "framed" glass indicator thereon.
Fig. 2 is a section on line 2—2 of Fig. 1, showing rubbing contact between the faces of the glass panels bearing the hairlines and the faces of the rule bearing the graduated scales.
Fig. 3 is a plan view of the same end portion of the "Duplex" slide rule shown in Fig. 1, except that the indicator has been removed and the form and location of the new septa there disclosed.

Referring to the drawing:

In Figs. 1 and 2 is illustrated one end portion of the "Duplex" slide rule 13, having the side bars 14 and 15 connected by the tie plates 16 secured thereto, and having the usual slide 17 in sliding engagement with and between said bars; both sides of the rule being provided with graduated scales here omitted. In sliding engagement with said rule 13, is the "framed" glass indicator 18, consisting of the frame 19, end pieces 20, flanges 21, and glass panels 22 and 23, united by screws 24; each panel being provided with the hairline 25 and the face of each panel bearing the hairline being in rubbing contact with the face of the rule bearing the scales.

Figures 4, 5, 6, 7:
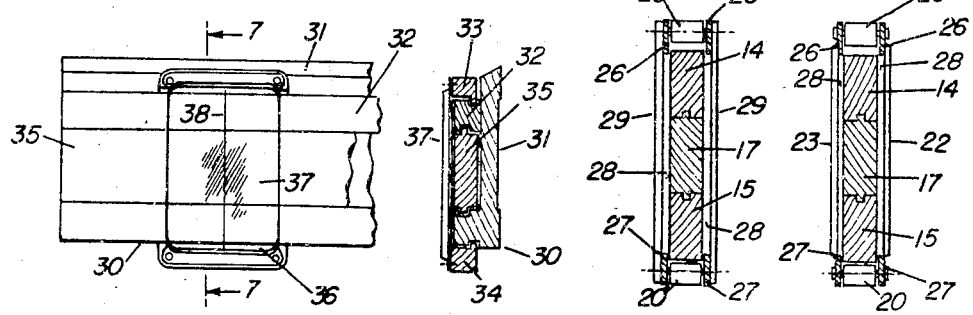
Fig. 4 is a section on line 4—4 of Fig. 3, with the "framed" glass indicator restored, showing the said septa operatively installed to form the said clearance.
Fig. 5 is a section similar to that shown in Fig. 4, except that the new septa are shown installed in a "frameless" glass indicator.
Fig. 6 is a plan view of one end portion of the "Mannheim" slide rule, showing the "framed" glass indicator thereon.
Fig. 7 is a section on line 7—7 of Fig. 6, showing rubbing contact between the face of the glass panel bearing the hairline and the face of the rule bearing the scales.

Figs. 3 and 4 show the construction of the "Duplex" slide rule shown in Figs. 1 and 2, showing the new septa 26 and 27 installed between the end pieces 20 and the flanges 21, forming the clearance 28.

In Fig. 5 the new septa are shown as used in connection with the "frameless" glass indicator in order to form the required clearance 28 between the glass panels 29 and the rule.

Figs. 6 and 7 show the construction of the "Mannheim" slide rule 30, having the base 31, side bar 32, and slide 35; only one side of the rule being provided with scales here omitted. In sliding engagement with the rule is the "framed" glass indicator 36, having the end pieces 33 and 34, and glass panel 37, which is provided with the hairline 38, and the face of the glass bearing the hairline being in rubbing contact with the face of the rule bearing the scales.

Figures 8, 9, 10:
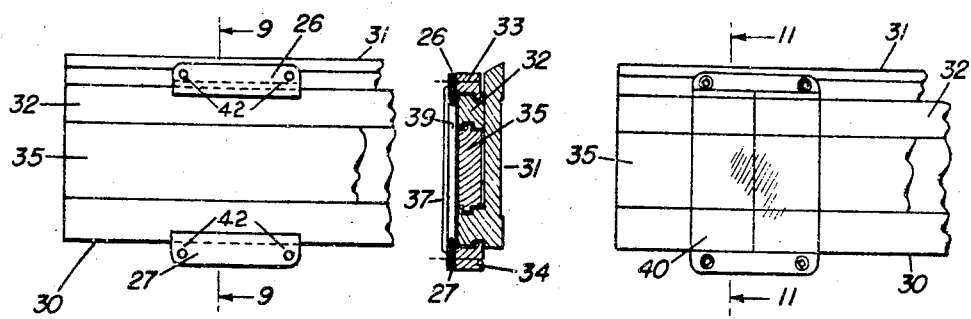
Fig. 8 is a plan view of the same end portion of the "Mannheim" slide rule shown in Fig. 6, except that the indicator has been removed and the form and location of the new septa there disclosed.
Fig. 9 is a section on line 9—9 of Fig. 8 with the "framed" glass indicator restored, showing the new septa installed so as to form the said clearance.
Fig. 10 is a plan view of the same end portion of the "Mannheim" slide rule shown in Fig. 6, except for the use of a "frameless" glass indicator.

Figs. 8 and 9 show the construction of the "Mannheim" slide rule shown in Figs. 6 and 7, showing the new septa 26 and 27 installed between the end pieces 33 and 34, and the flanges of the indicator, forming the clearance 39.

Figures 11, 12, 13:
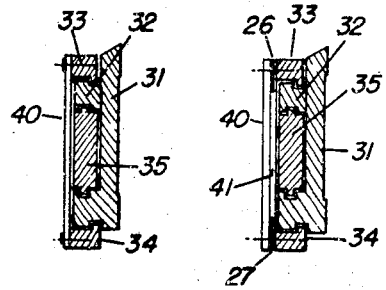
Fig. 11 is a section on line 11—11 of Fig. 10, showing rubbing contact between the face of the glass panel bearing the hairline and face of the rule bearing the scales.
Fig. 12 is a section similar to that shown in Fig. 11, showing the new septa installed so as to form the said clearance.
Fig. 13 is a plan view of one of the new septa detached from the indicator.

Figs. 10 and 11 show the same end portion of the "Mannheim" slide rule shown in Figs. 6 and 7, except for the use of a "frameless" glass indicator, showing the glass panel 40, and the face of said glass panel, bearing the hairline, in rubbing contact with the face of the rule bearing the scales.

Fig. 12 is a section similar to that shown in Fig. 11 showing the new septa 26 and 27 installed between the end pieces 33 and 34 and the glass panel 40, forming the clearance 41.

Fig. 13 shows on an enlarged scale a plan view of one of the septa 26 or 27, illustrating the loose engagement of the shanks of the screws 24 with the holes 42 extending therethrough; the said holes being made somewhat larger than the diameter of said shanks so that the said septa may have the means of a slight planar adjustment in order to accomplish and preserve parallel relation with the rule and also to change where required the overlap of the septum on the rule to render visible the graduated scale where near the edge of the rule.

All clearances 28, 39 and 41 are preferably about six thousandths of an inch (.006") which is ample for the ten inch (10") slide rule. Tests with models have shown that twice that much (2×.006"=.012") does not decrease the accuracy in reading the scales. The new septa 26 and 27, are preferably about six thousandths (.006") of an inch in thickness, but may vary between .006" and .012" to suit conditions such as slightly warped rules or slides. Preferably all septa are to be made of a hard and non-corrosive alloy metal with a low coefficient of friction and with smooth surfaces to resist wear and abrasion, but may be of any suitable material and of any proportions suitable for the purpose.

Flat strips of spring tempered steel .006 of an inch in thickness were used in the test models and were quite satisfactory for that purpose and they would be suitable for this invention except for the fact that they are subject to corrosion.

There are a few special purpose "Duplex" and "Mannheim" slide rules which have scales on the extreme outer edge of their faces. In such cases the new septa may be installed only where there is blank space on the edge of the rule for them. In the case where an indicator glass has only one septum under it, the efficiency of the device is decreased somewhat, but it is still a worthwhile improvement.

The invention may be embodied in other specific forms without departing from the spirit or essential characteristics thereof. The present embodiment, as above set forth, is therefore to be considered in all respects as illustrative and not restrictive, the scope of the invention being indicated by the appended claims rather than by the above description, and all changes which come within the meaning and range of equivalency of the claims are therefore intended to be embraced therein.

What I claim and desire to secure by Letters Patent is:

1. In a slide rule of the straight-edge type having a scaled surface, a transparent indicator slidably mounted upon said rule for longitudinal movement thereon, and septum means mounted between said indicator and the straight longitudinal edges of said rule in overlapping relation with respect to each longitudinal edge of the rule, thereby to maintain clearance between said indicator and the scaled surface of the said rule.

2. In a slide rule of the straight-edge type having a scaled surface, a transparent indicator slidably mounted upon said rule for longitudinal movement thereon, septum means mounted between said indicator and the straight longitudinal edges of said rule in overlapping relation with respect to each longitudinal edge of the rule, thereby to maintain clearance between said indicator and the scaled surface of the said rule, said septum means being formed with indicator attaching openings for mounting the same between the indicator and an edge of the said rule, and fastener means carried by the said indicator having a shank portion relatively smaller than said openings extending into the opening to hold the septum means in position, whereby said septum means may have planar movement with respect to the said shank portion to vary the extent of the overlap of said means with respect to the edge of the rule.

WILLIAM O. TEASDALE.

REFERENCES CITED

The following references are of record in the file of this patent:

UNITED STATES PATENTS

| Number | Name | Date |
|---|---|---|
| 2,086,502 | Keuffel | July 6, 1937 |
| 2,136,169 | Keuffel | Nov. 8, 1938 |
| 2,341,681 | Andersen | Feb. 15, 1944 |